(12) United States Patent
Rutkowski et al.

(10) Patent No.: US 7,265,539 B2
(45) Date of Patent: Sep. 4, 2007

(54) CALIBRATION OF A HALL EFFECT SENSOR

(75) Inventors: David J. Rutkowski, Grosse Isle, MI (US); John H. Floros, Novi, MI (US); Imad Sharaa, Farmington, MI (US)

(73) Assignee: Ford Motor Company, Dearborn, MI (US)

( * ) Notice: Subject to any disclaimer, the term of this patent is extended or adjusted under 35 U.S.C. 154(b) by 202 days.

(21) Appl. No.: 11/148,647

(22) Filed: Jun. 9, 2005

(65) Prior Publication Data

US 2006/0279276 A1   Dec. 14, 2006

(51) Int. Cl.
*G01R 33/07* (2006.01)
*G01B 7/30* (2006.01)

(52) U.S. Cl. .............. 324/207.2; 324/207.25; 324/251; 73/514.31; 73/514.39

(58) Field of Classification Search ......... 324/206.25, 324/207.2, 251, 244, 207.25, 260; 73/514.02, 73/514.16, 514.31, 514.39
See application file for complete search history.

(56) References Cited

U.S. PATENT DOCUMENTS

| | | | |
|---|---|---|---|
| 3,597,679 A | 8/1971 | Habfast | |
| 3,722,283 A | 3/1973 | Treharne et al. | |
| 4,293,814 A | 10/1981 | Boyer | |
| 4,327,416 A | 4/1982 | Jerrim | |
| 4,371,837 A | 2/1983 | Sieverin | |
| 4,521,727 A | 6/1985 | Atherton et al. | |
| 4,593,241 A | 6/1986 | Eulenberg et al. | |
| 4,634,961 A | 1/1987 | Popovic et al. | |
| 4,646,014 A | 2/1987 | Eulenberg | |
| 4,760,285 A | 7/1988 | Nelson | |
| 4,833,406 A | 5/1989 | Foster | |
| 4,857,842 A | 8/1989 | Sturman et al. | |
| 4,970,463 A | 11/1990 | Wolf et al. | |
| 5,055,768 A | 10/1991 | Plagens | |
| 5,402,064 A | 3/1995 | Eck et al. | |
| 5,545,983 A | 8/1996 | Okeya et al. | |
| 5,686,827 A | 11/1997 | Ward | |
| 5,698,778 A | 12/1997 | Ban et al. | |
| 5,789,917 A | 8/1998 | Oudet et al. | |
| 6,104,231 A | 8/2000 | Kirkpatrick, II | |
| 6,144,197 A | 11/2000 | Shimamura et al. | |
| 6,340,884 B1 | 1/2002 | Wolf et al. | |
| 6,351,116 B1 | 2/2002 | Bolda et al. | |
| 6,445,176 B1 * | 9/2002 | Wallrafen | 324/166 |
| 6,472,878 B1 | 10/2002 | Bruchmann | |
| 6,476,602 B1 | 11/2002 | Gray | |
| 6,483,301 B2 | 11/2002 | Kempe | |
| 6,567,763 B1 | 5/2003 | Javanifard et al. | |
| 6,727,689 B1 * | 4/2004 | Furlong et al. | 324/207.25 |
| 6,750,644 B1 | 6/2004 | Berkcan | |
| 2003/0158681 A1 | 8/2003 | Walter et al. | |
| 2004/0100252 A1 * | 5/2004 | Babin | 324/207.25 |
| 2004/0189284 A1 * | 9/2004 | Haubold et al. | 324/207.2 |
| 2004/0212341 A1 * | 10/2004 | Yamamoto et al. | 318/685 |

* cited by examiner

*Primary Examiner*—Bot LeDynh
(74) *Attorney, Agent, or Firm*—Greg Brown; MacMillan, Sobanski & Todd, LLC

(57) ABSTRACT

An actuator having an output shaft, a motor for rotating the output shaft between a first position and a second position, and an electronic control module having a controller and a sensor. The sensor is configured to output a signal to the controller indicative of the position of the output shaft, and the controller is configured to determine whether the output shaft is in the first position or the second position.

12 Claims, 1 Drawing Sheet

CALIBRATION OF A HALL EFFECT SENSOR

BACKGROUND

1. Field of the Invention

The present invention generally relates to electronically controlled actuators and methods used to configure electronically controlled actuators.

2. Description of the Known Technology

Automobiles are equipped with electronically controlled actuators for opening and closing of passageway door located throughout the automobile. These passageways may include heating, ventilation and air conditioning passageways or passageways for the intake manifolds of the vehicle's internal combustion engine. The actuators open and close doors in the passageways by rotating a shaft connected to the door. To do this, a controller that determines if the shaft has rotated the door to a fully opened or fully closed position by monitoring the output of a Hall Effect sensor. The Hall Effect sensor is able to determine the position of the shaft via a magnet is coupled to the shaft. As a shaft moves, so does the magnet, thereby varying the magnetic field about by the Hall Effect sensor. When the output of the Hall Effect sensor is a specific value indicating that the shaft has rotated the door to a fully opened or fully closed position, the controller will instruct the actuator to stop rotating the shaft.

Some Hall Effect sensors are programmable. Programmable Hall Effect sensors can be programmed to output a specific value when receiving a specific magnetic field. For example, a programmable Hall Effect sensor may be programmed to output the value X when the programmable Hall Effect sensor receives a magnetic field indicating that the actuator has fully opened the door and output the value Y when the programmable Hall Effect sensor receives a magnetic field indicating that the actuator has fully closed the door. This allows the controller to monitor for the specific values, X and Y, when determining if the actuator has rotated the door to a fully opened or fully closed position.

However, there are certain drawbacks to using programmable Hall Effect sensors. First, programmable Hall Effect sensors are more costly than non-programmable Hall Effect sensors. Second, in order to program a programmable Hall Effect sensor, one must be able to physically access a programming input port located on the programmable Hall Effect sensor. However, the programming input port is only accessible when the actuator is disassembled or additional connector pins are provided. Therefore, programmable Hall Effect sensors must be programmed when the actuator is disassembled. Upon assembly of the actuator, the distance between the magnet and the programmable Hall Effect sensor may change and may be different from that anticipated during programming. This change in distance will change the magnetic field received by the programmable Hall Effect sensor. In turn, the change in the amount of magnetic field received by the Hall Effect sensor will adversely affect the output of the programmable Hall Effect sensor and the accuracy of the system.

Therefore, there is exists a need for a cost effective solution that allows the controller to accurately determine when the actuator has moved the door to a fully opened or fully closed position.

BRIEF SUMMARY OF THE INVENTION

In overcoming the drawbacks and limitations of the known technology, a system and method for calibrating an actuator having a motor connected to an output shaft is disclosed. The actuator includes an output shaft, a motor for rotating the output shaft between a first position and a second position, and an electronic control module having a controller and a sensor. Preferably, the sensor is a non-programmable Hall Effect sensor. The sensor is configured to output an output signal to the controller indicative of the position of the output shaft. The controller is configured to determine whether the output shaft is in the first position or the second position based on the output signal.

The actuator may further include a magnet coupled to the output shaft. The magnet produces a magnetic field that is perceivable by the sensor. According to the position of the output shaft, the magnetic field perceived by the sensor will change.

The method requires that the output shaft of the actuator first be rotated to the first position where a first position value is read from the sensor. Next, the output shaft is rotated to the second position where a second position value is read from the sensor. Finally, based on these position values, the controller configures the actuator to rotate the output shaft to the first position or the second position using the motor.

These and other advantages, features, and embodiments of the invention will become apparent from the drawings, detailed description, and claims, which follow.

DETAILED DESCRIPTION

Figure 1:
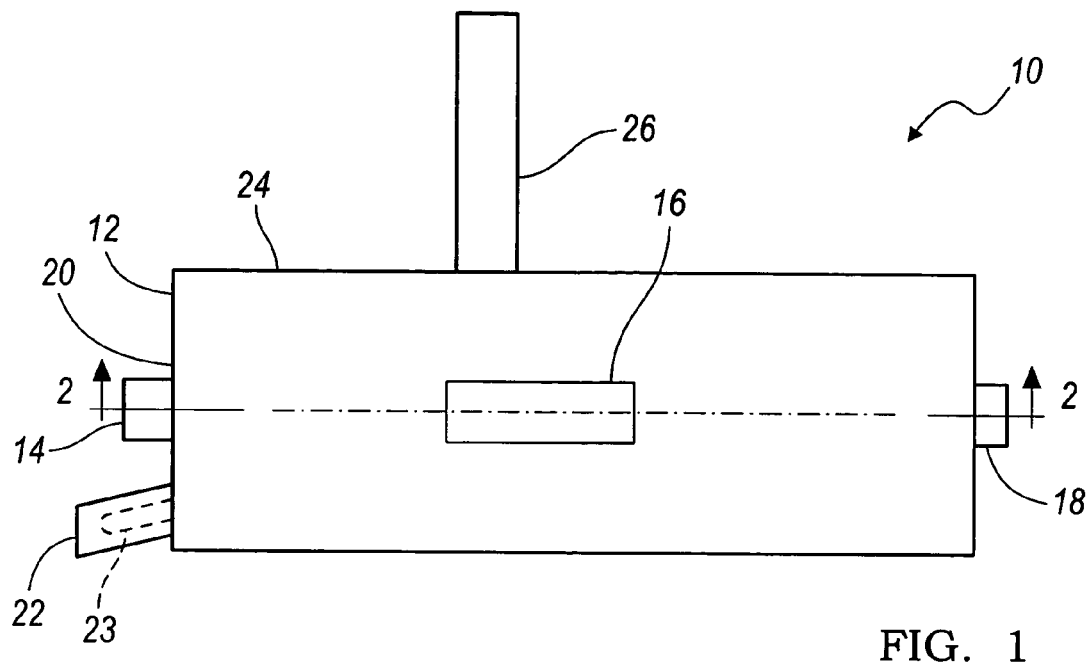
FIG. 1 is a side view of an actuator embodying the principles of the present invention.

Referring to FIG. 1, an actuator 10 is illustrated therein and includes a housing 12 having mounting points 14, 16, 18. The housing is typically made of plastic but may be made of metal. Extending from a side 20 of the housing 12 is an electrical connector 22 that allows for outside communication with the actuator 10 via a pin 23. Extending from a one side 24 of the housing 12 is an output shaft 26. Generally, the output shaft 26 is made of a metal, such as steel, but may alternatively be made of plastic.

Figure 2:
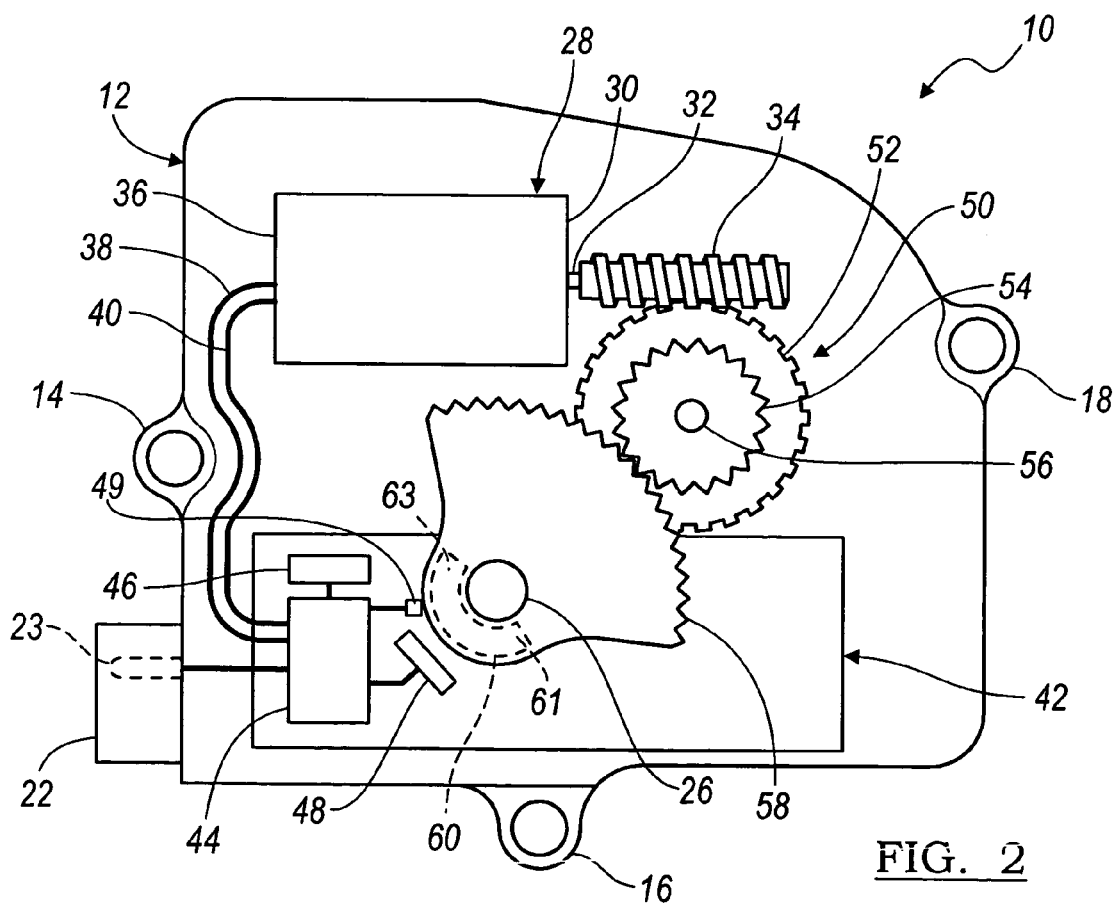
FIG. 2 is a cross-sectional view, generally taken along line 2-2, of the actuator seen in FIG. 1.

Referring now to FIG. 2, inside the housing 12 is located a motor 28, preferably an electrical motor of conventional construction. At a first end 30 of the motor 28 is an output 32 extends from one end 30 of the motor 28. Also extending from the motor 28 are motor control lines 38, 40.

In addition to the motor 28, disposed within the housing 12, is an electronic control module (ECM) 42 that is connected to the motor 28 via the control lines 38, 40. The ECM 42 includes a controller 44, a memory unit 46, and a Hall Effect sensor 48 and a diode 49. The Hall Effect sensor 48 is preferably a non-programmable Hall Effect sensor. Generally, the memory unit is a non-volatile memory unit in electrical communication with the controller 44. Alternatively, the controller 44 may contain an integrated memory unit, thus relinquishing the need of the memory unit 46.

The output 32 of the motor 28 is coupled to the output shaft 26 of the actuator 10 by way of a gear train 50. The gear train 50 includes a worm gear 34, a first sprocket 52, and a second sprocket 54. Generally, the first and second sprockets 52, 54 are made of plastic, but may be made of an alternative material, such as steel.

The worm gear 34 is mounted on, and rotates with, the output 32 of the motor 28. The worm gear 34 mechanically engages a first sprocket 52 and will rotate the sprocket 52 around the axis 56. The first sprocket 52, first is coupled to a second sprocket 54, which is concentric therewith and will also rotate around the axis 56.

The teeth on the second sprocket 54 engage corresponding teeth on a shaft sprocket or bell gear 58, which is in turn connected to the output shaft 26 of the actuator 10 so as to rotate therewith. Thus, when the second sprocket 54 is caused to rotate, the shaft sprocket 58 will rotate causing the output shaft 26 to correspondingly rotate.

Also coupled to the shaft sprocket 58 is a magnet 60. The Hall Effect sensor 48 is located proximate to the magnet 60 so that the magnetic field created by the magnet 60 can be detected by the Hall Effect sensor 48. With regard to the magnet 60, the magnet 60 is oriented such that during rotation of the shaft sprocket 58 the magnet's poles 61, 63 are caused to move relative to the Hall Effect sensor 48. The diode 49 is also placed proximate to both the magnet 60 and the Hall Effect sensor 48. The diode 49 is sensitive to temperature and will produce a voltage signal indicative of the temperature in the surrounding area, including the area near the Hall Effect sensor 48 and the magnet 60. The magnet 60 may be a neodymium iron boron (NeFeB) magnet but may be a Samarian cobalt (SmCo) magnet.

During operation of the actuator 10, the controller 44 continuously monitors the pin 23 of the electrical connector 22 for a calibration signal. Since the pin 23 of the electrical connector 22 may be used for other purposes, such as for receiving a signal for instructing the actuator 10 to rotate the output shaft 26, the calibration signal must be unique enough for the controller 44 to differentiate it from other signals.

One of many possible constructs for the calibration signal is a 1 kHz signal for 250 ms followed by a 2 kHz for 250 ms. The only requirement for this signal is that the calibration signal be unique enough for the controller 44 to differentiate it from other signals.

Once the controller 44 has determined that the pin 23 of the electrical connector 22 has received the calibration signal, the controller 44 will place the actuator 10 in a calibration mode and output an acknowledgment signal, such as a 10% duty cycle signal, through the pin 23 of the electrical connector 22. Alternatively, the acknowledgment signal may vary from the example. The only requirement for the acknowledgment signal being that acknowledgment signal is unique enough for an outside device (connected to the pin 23 of the electrical connector 22) to be able to differentiate the acknowledgment signal from other signals.

After the actuator 10 has been placed into the calibration mode, the actuator 10 follows an initial calibration technique method relating to calibrating the output of the Hall Effect sensor 48 after final assembly of the actuator 10.

First, the initial calibration technique requires that the output shaft 26 be rotated to a first position. This may be accomplished by an external force or by the motor 28. If the motor 28 is used to rotate the output shaft 26 to the first position, the controller 44 will instruct the motor 28 to rotate the output shaft 26 in a first direction.

In order to determine if the output of the shaft 26 has reached the first position, the controller 44 will monitor the output of the Hall Effect sensor 48 to determine if the output of the Hall Effect sensor 48 is changing. A first hard physical stop (not shown) will be used to prevent the shaft 26 from rotating beyond the first position. When the output of the Hall Effect sensor 48 is no longer changing over a period of time, the controller 44 will determine that the output shaft 26 has reached the first hard stop and therefore, the first position. The controller 44 will then instruct the motor 28 to stop rotating the output shaft 26 in the first direction. Afterward, the controller 44 takes a reading from the Hall Effect sensor 38 and stores the reading in the memory unit 46 as a first stop value.

Next, the output shaft 26 is then moved to a second position. Similarly as described above, this may be accomplished by an external force or by the motor 28. If the motor 28 is used to rotate the output shaft 26 to the second position, the controller 44 will instruct the motor 28 to rotate the output shaft in a second direction.

In order to determine if the output shaft 26 has reached the second position, the controller 44 will monitor the output of the Hall Effect sensor 48 to determine if the output of the Hall Effect sensor 48 is changing. A second hard physical stop (not shown) will be used to prevent the shaft 26 from rotating beyond the second position. When the output of the Hall Effect sensor 48 is no longer changing, the output shaft 26 has reached the second hard physical stop and therefore, the second position. The controller 44 will then instruct the motor 28 to stop rotating the output shaft 26 in the second direction. Afterward, the controller 44 takes a reading from the Hall Effect sensor 48 and stores the reading in the memory unit 46 as a second stop value.

When in operation, the output shaft 26 will be required to rotate to either the first position or the second position. Using the previously stored first and second stop values, the controller 44 will be able to determine when the output shaft 26 has reached either the first position or the second position. This is accomplished by having the controller 44 monitor the output of the Hall Effect sensor 48 and compare the output of the Hall Effect sensor 48 to the first and second stop values. When the output of the Hall Effect sensor 48 approximately matches the first or second stop values, the controller will determine that the output shaft 26 has reached either the first position or the second position and instruct the motor 28 to stop rotating the output shaft 26.

After the initial calibration technique is complete, a temperature compensation technique commences. The temperature compensation technique relates to the calibrating the actuator 10 is adjusting the output of the Hall Effect sensor 48 for changes in the temperature in the magnet 60 and the Hall Effect sensor 48. Similar to the previously described method, the output shaft 26 is moved to the first position and the second position by either and external force or the motor 28. Likewise, the first stop value and second stop value is stored in the memory unit 46.

Additionally, a reading from a diode 49 will be stored in the memory unit 46 as a calibration temperature value. The calibration temperature value is representative of the temperature near the magnet 60 and the Hall Effect sensor 48 and is usually a specific temperature, such as 25° C.

When in operation, the output of the Hall Effect sensor 48 will vary as the temperature of the Hall Effect sensor 48 and the magnet 60 change. The output of the diode 48, being near the Hall Effect sensor 48 and the magnet 60, will change in accordance to the change in temperature to the Hall Effect sensor 48 and the magnet 60.

During operation, the output of the diode 49 will be monitored and converted to a current temperature value. The current temperature value is then subtracted from the calibration temperature value to obtain a temperature difference value. Using the temperature difference value, the controller will calculate a correction factor. The correction factor may be calculated by using empirical data stored in the memory unit 46. The correction factor will then be subtracted from the first position indicator and added to the second position indicator to obtain a compensated first stop value and a compensated second stop value.

In operation, the output shaft 26 will be required to rotate to either the first position or the second position. Using the previously calculated compensated first and second stop values, the controller 44 will be able to determine when the output shaft 26 has reached either the first position or the second position. This is done by having the controller 44 monitor the output of the Hall Effect sensor 48 and compare the output of the Hall Effect sensor 48 to the compensated first and second stop values. When the output of the Hall Effect sensor 48 approximately matches the compensated first or second stop values, the controller will determine that the output shaft 26 has reached either the first position or the second position and instruct the motor 28 to stop rotating the output shaft 26.

The foregoing description of the embodiment of the invention has been presented for purposes of illustration and description. It is not intended to be exhaustive or to limit the invention to the precise embodiment disclosed. Numerous modifications or variations are possible in light of the above teaching. The embodiment discussed was chosen and described to provide the best illustration of the principles of the invention in its practical application to thereby enable one of ordinary skill in the art to utilize the invention in various embodiments and with various modifications as are suited to the particulate use contemplated. All such modifications and variations are within the scope of the invention as determined by the appended claims when interpreted in accordance with the breadth to which they are fairly, legally, and equitably entitled.

The invention claimed is:

1. An actuator comprising:
   a motor;
   an output shaft coupled to the motor, whereby the motor is adapted to rotate the output shaft one of a first position and second position;
   an electronic control module having a controller and a sensor, the sensor being in communication with the controller configured to output an output signal to the controller indicative of a position of the output shaft; and
   the controller being configured to calibrate the sensor when in a calibration mode, wherein the first position is determined as being reached after the motor is rotated in a first direction and the output sensor indicates no change in the output signal over a first period of time, and wherein the second position is determined as being reached after the motor is rotated in a second direction and the output sensor indicates no change in the output signal over a second period of time.

2. The actuator of claim 1, further comprising a gear train in mechanical communication between the motor and the output shaft.

3. The actuator of claim 1, wherein the electronic control module includes a memory unit in communication with the controller.

4. The actuator of claim 3, wherein the memory unit is a non-volatile memory unit.

5. The actuator of claim 1, further comprising a magnet coupled to the output shaft, whereby the magnet produces a magnetic field detectable by the sensor.

6. The actuator of claim 5, wherein the sensor is a Hall Effect sensor.

7. The actuator of claim 1, wherein the Hall Effect sensor is a non-programmable Hall Effect sensor.

8. A method for calibrating an actuator having a motor connected to an output shaft, the method comprising the steps of:
   rotating the output shaft to a first position;
   providing a first stop value;
   recording the first stop value after the output sensor indicates no change in the output signal over a first period of time;
   rotating the output shaft to a second position;
   providing a second stop value;
   recording the second stop value after the output sensor indicates no change in the output signal over a second period of time;
   configuring a controller to rotate the output shaft to one of the first position and the second position using the motor and based on the first and second stop values.

9. The method of claim 8, further comprising the step of determining if the output shaft has reached the first position.

10. The method of claim 9, wherein determining if the output shaft has reached the first position comprises the steps of:
    providing a first sensor reading;
    waiting a period of time;
    providing a second sensor reading; and
    determining if the first sensor reading is substantially similar to the second sensor reading.

11. The method of claim 8, further comprising the step of determining if the output shaft has reached the second position.

12. The method of claim 11, wherein determining if the output shaft has reached the second position comprises the steps of:
    providing a first sensor reading;
    waiting a period of time;
    providing a second sensor reading;
    determining if the first sensor reading is substantially similar to the second sensor reading.

* * * * *